United States Patent

[11] 3,560,723

[72] Inventor Shin-Ichi Kamachi
 Tokyo, Japan
[21] Appl. No. 800,935
[22] Filed Feb. 20, 1969
[45] Patented Feb. 2, 1971
[73] Assignee Olympus Optical Co., Ltd.
 Tokyo, Japan
[32] Priority Mar. 1, 1968
[33] Japan
[31] 43/12870

[54] DEVICE FOR GENERATING AN INSTRUCTION SIGNAL FOR USE IN AN AUTOMATIC DIGITAL READ-OUT APPARATUS
 3 Claims, 9 Drawing Figs.

[52] U.S. Cl. .................................................... 235/92
[51] Int. Cl. ..................................................... G06m 3/12,
 H03k 21/12
[50] Field of Search ......................................... 235/92, 65,
 73, 74, 29

[56] References Cited
 UNITED STATES PATENTS
 3,495,073 2/1970 James ........................... 235/92

3,296,525 1/1967 Sakuma ........................ 324/68

Primary Examiner—Maynard R. Wilbur
Assistant Examiner—Robert F. Gnuse
Attorney—Otto John Munz ABSTRACT: Device for generating an instruction signal for demanding the digitally measured value of displacement to be transferred from the measuring station to the memory of an automatic digital readout apparatus. The measuring station generates a counting pulse successively each time the displacement reaches a measuring unit so as to be applied to the electronic counter of the automatic digital readout apparatus so that the digitally indicated measured value corresponding to the displacement is generated therein. A detecting pulse is generated when the displacement reaches the desired measuring point thereof, and this detecting pulse is applied to the electronic counter so as to permit the digitally indicated measured value provided therein at the measuring point of the displacement to be transferred to the memory whenever the interference period of the electronic counter elapses, in which interference period the electronic counter can not provide the correct digitally indicated measured value due to the counting operation therein.

INVENTOR
SHIN-ICHI KAMACHI

DEVICE FOR GENERATING AN INSTRUCTION SIGNAL FOR USE IN AN AUTOMATIC DIGITAL READ-OUT APPARATUS

BACKGROUND OF THE INVENTION

The present invention relates to a device for generating an instruction signal for use in an automatic digital readout apparatus and, more particularly, to the device of the type described above which can positively prevent an incorrect digitally indicated measured value of a displacement from being generated due to the interference period of the electronic counter of the apparatus, in which interference period shift-up in the counting process and the like is being carried out in the electronic counter so that the correct indicated measured value can not be obtained in the interference period.

Recently, a digital measuring apparatus such as a pulse-generating apparatus mounted on the rotating shaft of a lead screw, a length or angle-measuring instrument utilizing Moire fringes, and a digital voltmeter and the like has been widely developed. These digital-measuring apparatuses generate in general electric pulses in the measuring station of the apparatus which are the multiple of the measuring unit corresponding to the displacement to be measured, and these electric pulses are utilized as counting pulses which are applied to the electronic counter of the apparatus so as to effect the counting. Therefore, the measured value is indicated as the numerical value in the indicating station of the electronic counter.

Thus, the troublesome and time consuming procedure required in reading out a scale or a pointer of a measuring instrument heretofore used in the measurement can be entirely eliminated.

However, even though an electronic counter is utilized, the procedure to readout the digitally indicated measured value appearing in the indicating station of the electronic counter is still required. Such a procedure is, under particular conditions, very troublesome and time consuming.

That is, in order to readout the digitally indicated measured value appearing in the indicating station of the electronic counter, it is necessary that the indicated measured value remains unchanged in the indicating station until the readout of the indicated measured value is completed, thus necessitating the measuring station to be kept at rest in the readout period so that no counting pulses are applied to the electronic counter.

When the pitch of a lead screw is to be measured by a digital-measuring apparatus, for example, a number of electric pulses proportional to the displacement of the table carrying the lead screw thereon which corresponds to the pitch of the lead screw are applied to the electronic counter so as to obtain the digitally indicated measured value of the displacement of the lead screw corresponding to one pitch thereof. In this case, in order to set the measuring point of the lead screw, a separate detector such as a microscope mounted fixedly on the apparatus is provided, and the image of the lead screw is viewed through the microscope so that the table carrying thereon the lead screw is stopped each time successive one of the predetermined points on the lead screw appears at the set point in the field of view of the microscope as the table is moved.

Therefore, in case a large number of screw threads are to be measured for determining the pitch of the lead screw, the procedure for reading out the indicated measured value becomes more troublesome as the number of the measuring points increases.

For this reason, it is desirable if the measurement such as that for determining the pitch of a lead screw can be carried out automatically and continuously without stopping the movement of the table carrying the lead screw in case a large number of measuring points must be measured. There are many cases in which it is desired to carry out the measurement continuously and automatically because of a large number of the measuring points to be measured.

Thus, the utility of a digital-measuring apparatus will be extremely increased, if the readout procedure of the digitally indicated measured value in the apparatus is not required by fully automating the digital-measuring apparatus as described above.

In order to achieve the above-described full automation of the apparatus, there are several processes, in which, for example, the digitally indicated measured value obtained in the electronic counter is transferred to a separate memory of the apparatus each time the measurement reaches the desired measuring point, or two electronic counters are provided which are alternately connected to the electronic counter for the measurement and the indicated measured value obtained therein is transmitted to a separate memory of the apparatus.

To this end, the detector as described previously must be replaced by the one which can generate an electric pulse each time the measured value is to be readout.

In the measurement of the pitch of a lead screw as described above, for example, a photoelectric microscope is used in place of the microscope described above, which photoelectric microscope can generate an electric pulse as the predetermined point in the image of the lead screw appearing in the field of view of the microscope comes in coincidence with the set point in the field of view.

At the same time, an output circuit is provided in the electronic counter which can effect the coding of the indicated measured value obtained in the electronic counter, and an instruction pulse for demanding the readout of the indicated measured value constructing applied to the output circuit thereby permitting the indicated measured value in the electronic counter to be transferred to the memory so as to permit the indicated measured value to be read out from the memory.

Such a procedure can, for example, be carried out by constructing the memory by the same number of flip-flop circuits as that of the flip-flop circuits constructing the electronic counter and by making the respective flip-flop circuits in the memory correspond to the respective ones in the electronic counter so as to form the respective pairs of the flip-flop circuits. And the output of each of the flip-flop circuits in the electronic counter and the readout instruction pulse obtained by the detecting pulse are applied to an AND circuit and the output of the AND circuit is applied to the corresponding flip-flop circuit in the memory forming the pair with the respective flip-flop circuit in the electronic counter.

Thus, in the case as described above, the detecting pulse is applied to the output circuit each time the predetermined point in the image comes in coincidence with the set point in the field of view of the photoelectric microscope used as the detector, so that the indicated measured value appearing in the electronic counter at the time the read-out instruction pulse is applied to the output circuit is transferred to the memory through the output circuit thereby permitting the thus transferred indicated measured value in the memory to be kept unchanged until the next detecting pulse is applied to the output circuit. Therefore, the measurement can be effected automatically and completely continuously.

The above-described apparatus in which the condition existing in an electronic circuit is successively transferred to another electronic circuit by a detecting pulse so as to be stored therein can be easily constructed by well-known technique. However, serious problems arise in such an apparatus by merely constructing the same as described above. In other words, by such a construction of the apparatus, possibility of the faulty function of the apparatus cannot be avoided.

That is, when the digitally indicated measured value in the electronic counter is transferred to the memory by means of the detecting pulse, the indicated measured value in the electronic counter must be kept unchanged during a certain time period, even though it is very short, in order to correctly transfer the indicated measured value to the memory. However, the digitally indicated measured value in the electronic counter comprises in general a plurality of numerals, and a time period, even though it is very short, is required for shifting up of the numerals in the digitally indicated measured value in order to set the correct indicated value. Therefore, a certain time period is required until the correct indicated value is obtained and kept unchanged after the counting pulse is applied to the electronic counter.

In such a time period required for obtaining the correct indicated value after the application of the counting pulse to the electric counter, the indicated measured value in the electronic counter will not always be correct. Therefore, should the detecting pulse be applied to the output circuit in such a very limited time period, there might occur a danger that the digitally indicated measured value transferred to the memory is incorrect. The time period referred to above will be called the interference period of the electronic counter hereinafter.

The present invention aims at avoiding the above-described disadvantages and providing a novel and useful device for generating an instruction signal for use in an automatic digital readout apparatus which can properly transfer the indicated measured value from the electronic counter to the memory of the apparatus by applying the readout instruction signal even though the same is applied to the electronic counter within the interference period thereof.

SUMMARY OF THE INVENTION

An object of the present invention is to provide a novel and useful device for generating an instruction signal for use on an automatic digital readout apparatus utilizing counting pulses generated in response to a displacement to be measured, which device can properly transfer the digitally indicated measured value obtained in the electronic counter of the apparatus in response to the displacement to be measured to the memory of the apparatus by means of the readout instruction signal derived from a detecting pulse generated at the measuring point of the displacement.

Another object of the present invention is to provide a novel and useful device of the type described above, which can properly transfer the digitally indicated measured value obtained in the electronic counter to the memory even though the detecting pulse is applied to the electronic counter within the interference period thereof.

In accordance with the present invention, the application of the readout instruction signal derived from the detecting pulse, which is generated at the measuring point of the displacement, to the output circuit of the electronic counter can be positively delayed until the interference period elapses. When the detecting pulse is generated within the interference period, whereas, when the detecting pulse is generated after the interference period elapses, the readout instruction signal is applied to the electronic counter simultaneously with the generation of the detecting pulse. Thus, the faulty function of the automatic digital readout apparatus can be positively avoided thereby permitting the apparatus to be used widely in various applications.

As previously described, in an automatic digital readout apparatus, when the measuring station thereof is not at rest, the counting pulses are successively applied to the electronic counter, while the counting pulses are not applied to the electronic counter when the measuring station is at rest, and a certain time period referred to above as the interference period is required until the shifting up of the numerals of the indicated measured value is completed in the electronic counter and the electronic counter assumes the steady rate indicating the correct digitally indicated measured value in response to the particular counting pulse applied to the electronic counter after the application of the same to the electronic counter.

Therefore, if the detecting pulse is generated within the interference period, the application of the readout instruction signal derived from the detecting pulse to the output circuit of the electronic counter must be delayed after the interference period elapses. On the other hand, if the detecting pulse is generated after the interference period elapses, the readout instruction signal derived from the detecting pulse may be applied to the output of the electronic counter simultaneously with the generation of the detecting pulse.

Therefore, the present invention provides a novel and effective device for generating the readout instruction signal efficiently used in the automatic digital readout apparatus of the type described above.

DETAILED DESCRIPTION OF THE PREFERRED EMBODIMENTS

Prior to the description of the present invention prior art automatic digital readout apparatus will be briefly described for the better understanding of the present invention.

Figure 1:
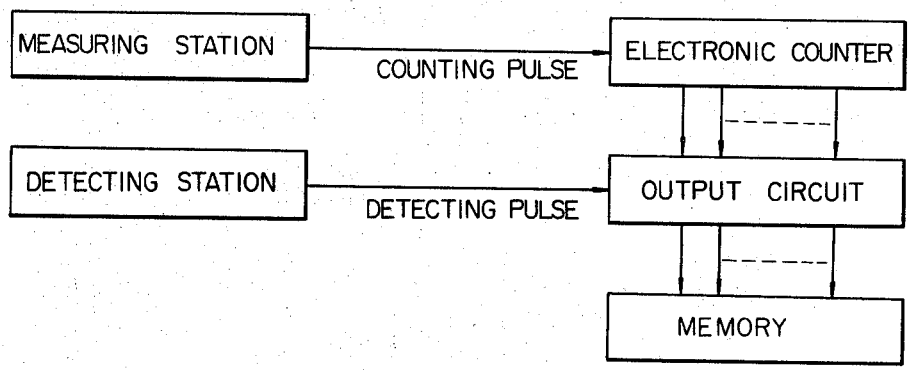
FIG. 1 is a block diagram showing the general type of an automatic digital readout apparatus utilizing an electronic counter.

In FIG. 1, the electronic counter is provided with an output circuit which can effect the coding of the digitally indicated measured value generated in the electronic counter in response to the counting pulses supplied thereto from the measuring station, the counting pulses being generated in the measuring station in proportion to the displacement to be detected as described previously. A detecting pulse is generated in the detecting station when the displacement reaches the desired measuring point thereof and this detecting pulse is applied to the output circuit from the detecting station, so that the content of the electronic counter is transferred to the memory so as to be readout therefrom.

Figure 2:
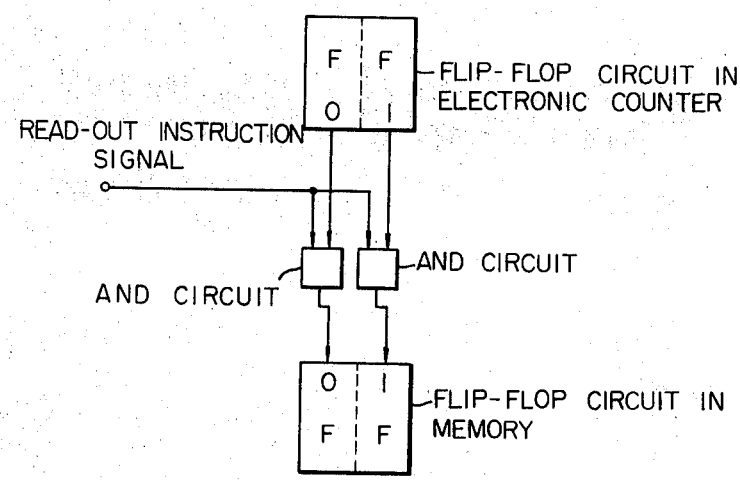
FIG. 2 is a block diagram exemplarily showing the general type of the circuit for transferring the digitally indicated measured value obtained in the electronic counter to the memory of the apparatus.

The memory comprises the same number of flip-flop circuits as that of the flip-flop circuits in the electronic counter and each of the flip-flop circuits in the memory is combined with the respective mating flip-flop circuit in the electronic counter so as to form the respective pair as shown in FIG. 2. An AND circuit is provided between the flip-flop circuits forming the pair as shown, to which the detecting signal, i.e. the readout instruction signal in this case is applied so that the output of the AND circuit is applied to the flip-flop circuit in the memory. Thus, each time the readout instruction signal is applied to the AND circuit, the indicated measured value generated in the electronic counter is transferred to the memory by means of each of the pairs of the flip-flop circuit as shown in FIG. 2, and the thus transferred indicated measured value is kept unchanged until the next instruction signal is applied to the AND circuit so as to facilitate the readout of the indicated measured value from the memory.

Figure 3:
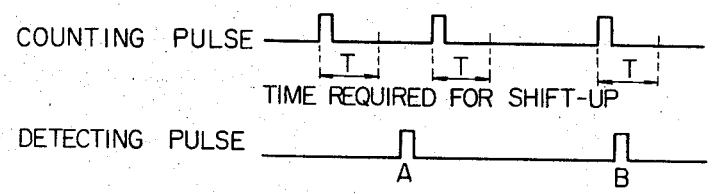
FIG. 3 is a diagrammatical view showing the possibility of occurrence of faulty functions depending upon the time relationship between the counting pulse and the detecting pulse in the operation of the automatic digital readout apparatus of the prior art.

Thus, the correct indicated measured value can be transferred to the memory insofar as the readout instruction signal is applied to the AND circuit after the interference period T of the electronic counter elapses as indicated by A in FIG. 3. However, if the readout instruction signal is applied to the AND circuit within the interference period T of the electronic counter as indicated by B in FIG. 3, there is a possibility that the correct indicated measured value might not be transferred to the memory for the reason previously described.

The present invention provides a device for generating a readout instruction signal in an automatic digital readout apparatus which can positively prevent the readout instruction signal derived from the detecting signal from being supplied to the output circuit of the electronic counter until the interference period thereof elapses after the application of the counting pulse to the electronic counter. Thus, an automatic digital readout apparatus can be freely used broadly in various applications in accordance with the present invention.

Now, the embodiments of the present invention will be described in connection with the drawings.

Figure 4:
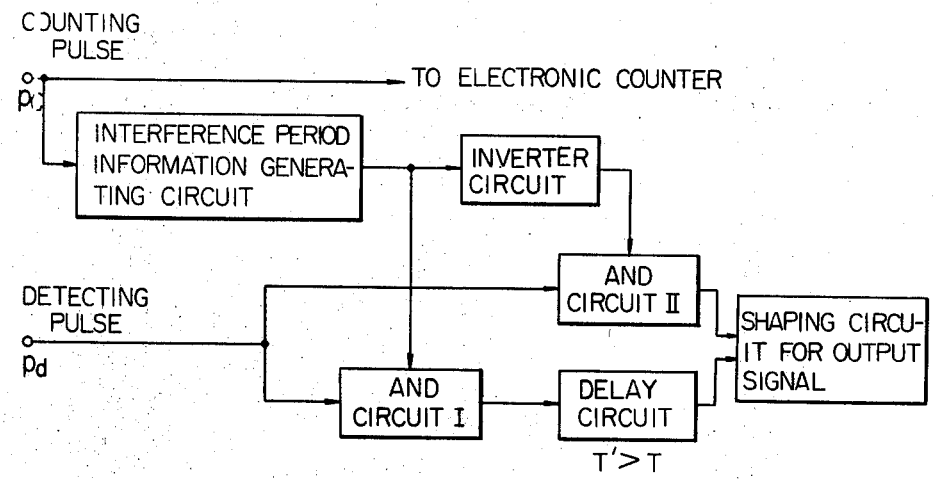
FIG. 4 is a block diagram showing an embodiment of the instruction of the device for automatically generating the readout instruction signal constructed in accordance with the present invention which can eliminate entirely the faulty functions.

In FIG. 4 showing the embodiment of the present invention, counting pulses PC are applied to an interference period information generating circuit which generates upon receipt of each of the counting pulses PC an output having the duration corresponding to the interference period T. The output of the interference period information generating circuit is applied to an inverter circuit connected thereto so as to apply the inverted interference period information from the inverter circuit to an AND circuit II. On the other hand, the detecting pulse Pd is adapted to be applied to the AND circuit II, so that, when the detecting pulse Pd is applied thereto after the output of the interference period information generating circuit is extinguished, i.e. after the interference period T elapses after the interference period T elapses after the application of the particular counting pulse PC to the interference period information generating circuit as indicated by B in FIG. 5, the AND circuit II generates an output, because it receives the inverted output of the interference period information generating circuit from the inverter circuit, thereby permitting the output of the AND circuit II to be applied to a shaping circuit for the output signal connected thereto. Thus, the output of the shaping circuit can be used as the readout instruction signal without causing any faulty function of the electronic counter, because the interference period has already elapsed at the time the detecting pulse Pd is applied to the AND circuit II. The device shown in FIG. 4 further comprises another AND circuit I adapted to receive the detecting pulse Pd and the output of the interference period information generating circuit. The output of the AND circuit I is applied to a delay circuit connected thereto which has a delay time T' longer than the interference period T. The delay circuit is also connected to the shaping circuit so as to apply the output of the delay circuit to the shaping circuit.

Thus, when the detecting pulse Pd is applied to the AND circuit I within the interference period after application of the counting pulse PC to the interference period information generating circuit, the AND circuit I is actuated so that the output thereof is applied to the delay circuit thereby permitting the output thereof which is delayed by the time T' from the output of the AND circuit I to be applied to the shaping circuit. Therefore, the output of the shaping circuit can be used as the readout instruction signal without causing any faulty function of the electronic counter, because the output of the shaping circuit is delayed by the time T' which is longer than the interference period T from the application of the detecting pulse Pd by means of the delay circuit. At the time either one of the AND circuits I and II is actuated, the other of the AND circuits is not actuated by virtue of the provisions of the inverter circuit.

Figure 5:
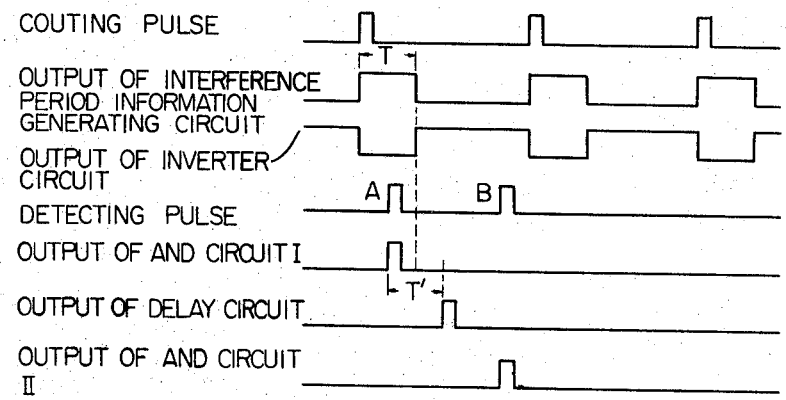
FIG. 5 shows a time chart showing the principle of the operation of the device of FIG. 4.

The operation of the above-described device is fully understood by the time chart shown in FIG. 5. When the counting pulse PC appears as shown in the drawing, the output of the interference period information generating circuit is generated as shown, the duration of which output is T beginning at the application of the counting pulse PC, while the output of the inverter circuit appears as shown, which is the inversion of the output of the interference period information generating circuit.

Now, should the detecting pulse Pd be applied to the device at a time within the interference period T as indicated by A in FIG. 5, then the AND circuit I generates an output while the AND circuit II is kept inoperative, because the inverter circuit is interposed between the interference period information generating circuit and the AND circuit II. Thus, the output to be applied to the shaping circuit is supplied from the AND circuit I and the output is delayed by the delay period T' of the delay circuit.

Should, however, the detecting pulse Pd be applied to the device after the interference period T releases as indicated by B in FIG. 5 so that the output thereof has been extinguished, the AND circuit I is inoperative while the AND circuit II generates an output because of the interposition of the inverter circuit between the interference period information generating circuit and the AND circuit II, and the output of the AND circuit II is applied to the shaping circuit for the readout instruction signal. Since the detecting pulse Pd is applied after the interference period T has elapsed, no interference occurs between the counting operation to be carried out in the electronic counter and the readout instruction signal applied thereto.

Figure 6:
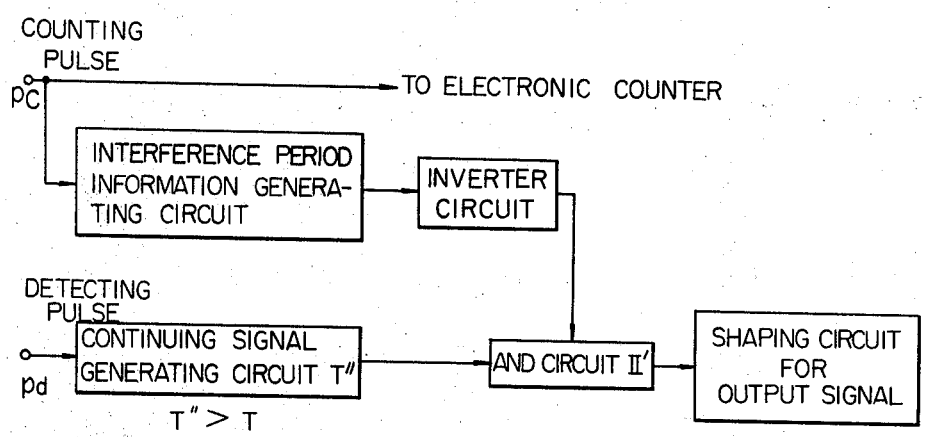
FIG. 6 is a block diagram exemplarily showing a modification of FIG. 4.

FIG. 6 shows a modification of the device shown in FIG. 4. In the device shown in FIG. 6, a continuing signal generating circuit is used in place of the AND circuit I and the delay circuit own in FIG. 4. The continuing signal generating circuit is adapted to receive the detecting pulse Pd as shown and generates a continuing signal having the duration T'' longer than the interference period T when it receives the detecting pulse Pd. The continuing signal generating circuit is connected to an AND circuit II' which receives the inverted output of the interference period information generating circuit in like manner as in the case of FIG. 4. The AND circuit II' is connected to a shaping circuit for the readout instruction signal similar to that shown in FIG. 4.

In the device shown in FIG. 6, there is a restriction that the time at which the continuing signal generated in the continuing signal generating circuit upon application of the detecting pulse Pd thereto is extinguished must be the time at which no output of the interference period information generating circuit exists. To this end, the continuing period T'' of the output of the continuing signal-generating circuit must be made greater than the interference period T of the electronic counter, or the continuing signal is extinguished after an output appears in the AND circuit II u e to the nonexistence of the output of the interference period information generating circuit.

Figure 7:
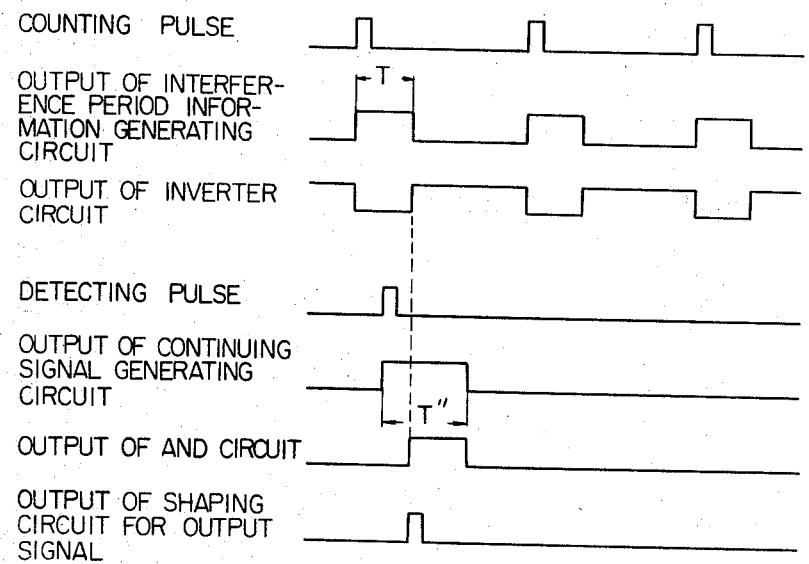
FIG. 7 shows a time chart showing the principle of the operation of the device of FIG. 6.

The operation of the device of FIG. 6 is best understood by the time chart shown in FIG. 7.

When the counting pulse PC appears as shown in FIG. 7, the output each of the interference period information generating circuit and the inverter circuit is generated as shown.

If the detecting pulse Pd is applied within the interference period T as shown in FIG. 7, a continuing signal T'' is generated by the continuing signal-generating circuit. Since the time period T'' is greater than the time period T, the output of the interference period information generating circuit does not exist at the time at which the continuing signal of the continuing signal-generating circuit extinguishes. Therefore, an output is generated by the inverter circuit when the continuing signal T'' extinguishes, thereby generating an output in the AND circuit II'. Thus, the shaping circuit produces the readout instruction signal so as to demand the transfer of the indicated measured value generated in the electronic counter to the memory without causing any faulty function of the electronic counter.

If the detecting pulse Pd is applied to the device when the interference period information T does not exist, the AND circuit II' is immediately operated to produce the output thereof by virtue of the provision of the inverter circuit.

Figure 8:
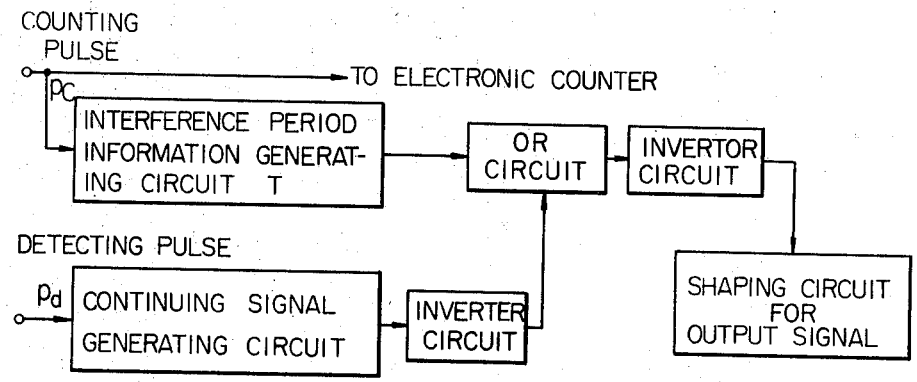
FIG. 8 is a block diagram showing a further modification of the device shown in FIG. 4.

FIG. 8 shows a further modification of the device of FIG. 6. The circuit shown in FIG. 8 is substantially similar in function to the circuit shown in FIG. 6.

The mutual conversion of the circuit between those shown in FIGS. 6 and 8 can be effected by the principle of the logic function indicated below.

(Interference period information) ∧ (Continuing signal information of detecting pulse) = (Interference period information) ∨ (Inverted output of continuing signal information)

In FIG. 8, an OR circuit is connected to the interference period information generating circuit and the inverted output of the continuing signal-generating circuit is applied to the OR circuit. Another inverter circuit is connected to the OR circuit and the output of this inverter circuit is applied to the shaping circuit for the readout instruction signal. The operation of the circuit of FIG. 8 will be apparent from the above description.

Figure 9:
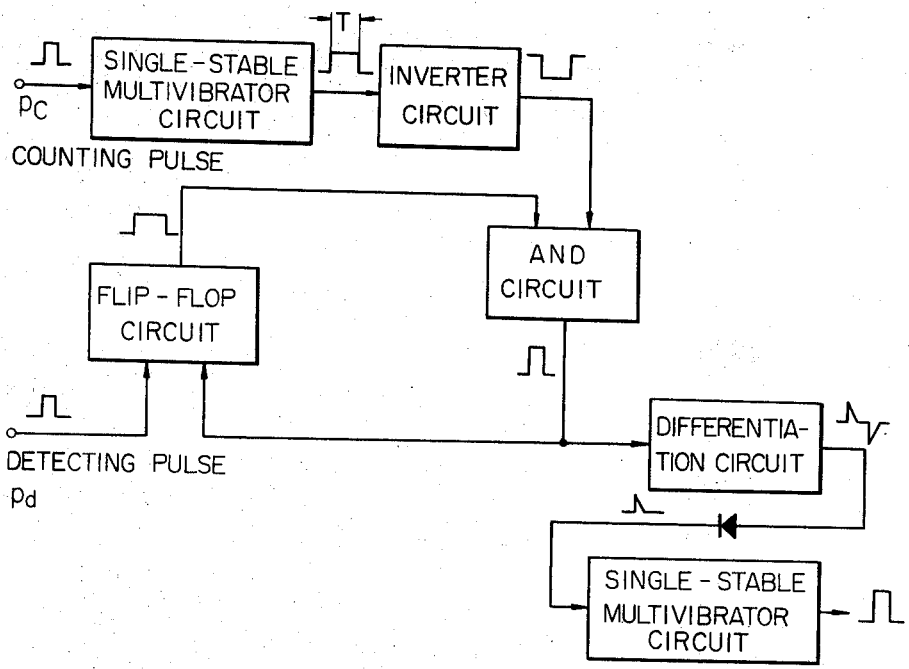
FIG. 9 is a diagrammatical view showing the circuitry embodying the device shown in FIG. 4.

FIG. 9 shows an embodiment of FIG. 6. In this embodiment, a monostable multivibrator circuit is used as the interference period information generating circuit so as to generate a rectangular wave continuing for the time period T upon receipt of a counting pulse as the output. This output of the monostable multivibrator circuit is applied to the inverter circuit so as to produce the inverted output.

On the other hand, a flip-flop circuit is used as the continuing signal-generating circuit, which flip-flop circuit receives the detecting pulse so as to generate an output.

Both the above outputs are applied to an AND circuit as shown, so that the output of the AND circuit is fed back to the flip-flop circuit thereby permitting the same to be reset while a differentiation circuit connected to the AND circuit is actuated by the output of the AND circuit so that the peak of the output of the differentiation circuit actuates another monostable multivibrator circuit connected thereto. The output of this monostable multivibrator circuit is used as the readout instruction signal.

As described above, the present invention can be broadly used in various applications, for example, in the case in which the computation is carried out between two electronic counters which are being operated without any faulty function caused by the interference period of each of the electronic counters, such as in the case in which the interference of an electronic counter is avoided when the indicated measured value in the electronic counter which is being operated is added to or subtracted from another indicated measured value stored in a separate register.

I claim:

1. Device for generating an instruction signal for use in an automatic digital readout apparatus of the measured value relating to the displacement at the measuring point thereof, in which a counting pulse is successively generated each time the displacement reaches a measuring unit, and the thus generated pulses are applied to the electronic counter of said apparatus so as to provide the digitally indicated measured value corresponding to the displacement while the thus provided digitally indicated measured value is transferred to the memory of said apparatus by means of a detecting pulse generated when the displacement is at said measuring point thereof thereby permitting said digitally indicated measured value at said measuring point to be stored in said memory, wherein the improvement comprises an interference period information generating circuit adapted to receive said counting pulse so as to maintain an interference period information for a time period corresponding to the interference period in said electronic counter, in which interference period a correct digitally indicated measured value can not be obtained by said electronic counter due to the counting operation thereof, an AND circuit adapted to receive the inverted output of said interference period information generating circuit, and a continuing signal-generating circuit adapted to receive said detecting pulse so as to generate a continuing signal which is maintained until the output of said interference period information generating circuit is extinguished, the output of said continuing signal-generating circuit being applied to said AND circuit thereby permitting said instruction signal for demanding the transfer of said digitally indicated measured value at said measuring point from said electronic counter to said memory to be delayed until after said interference period elapses when said detecting pulse is applied to said continuing signal-generating circuit within said interference period whereas said instruction signal is applied simultaneously with the application of said detecting pulse to said continuing signal-generating circuit when said detecting pulse is applied thereto after said interference period elapses.

2. Device for generating an instruction signal for use in an automatic digital readout apparatus of the measured value relating to the displacement at the measuring point thereof, in which a counting pulse is successively generated each time the displacement exceeds a measuring unit, and the thus generated pulses are applied to the electronic counter of said apparatus so as to provide the digitally indicated measured value corresponding to the displacement, while the thus provided digitally indicated measured value is transferred to the memory of said apparatus by means of a detecting pulse generated when the displacement is at said measuring point thereof thereby permitting said digitally indicated measured value at said measuring point to be stored in said memory, wherein the improvement comprises an interference period information generating circuit adapted to receive said counting pulse so as to maintain an interference period information for a time period corresponding to the interference period in said electronic counter, in which interference period a correct digitally indicated measured value can not be obtained by said electronic counter due to the counting operation thereof, a first AND circuit adapted to receive the output of said interference period information generating circuit and said detecting pulse so as to provide an output to be applied to a delay circuit by which the output thereof is delayed from the input thereof by a time period longer than said interference period, and a second AND circuit adapted to receive the inverted output of said interference period information generating circuit and said detecting pulse, thereby permitting said instruction signal for demanding the transfer of said digitally indicated measured value at said measuring point to said memory to be obtained by the output of said delay circuit or the output of said second AND circuit after said interference period elapses, the application of said instruction signal being delayed until after said interference period elapses when said detecting pulse is applied within said interference period, whereas said instruction signal is applied simultaneously with the application of said detecting pulse when said detecting pulse is applied after said interference period elapses.

3. Device for generating an instruction signal for use in an automatic digital readout apparatus of the measured value relating to the displacement at the measuring point thereof, in which a counting pulse is successively generated each time the displacement exceeds a measuring unit, and the thus generated pulses are applied to the electronic counter of said apparatus so as to provide the digitally indicated measured value corresponding to the displacement, while the thus provided digitally indicated measured value is transferred to the memory of said apparatus by means of a detecting pulse generated when the displacement is at said measuring point thereof thereby permitting said digitally indicated measured value at said measuring point to be stored in said memory, wherein the improvement comprises an interference period information generating circuit adapted to receive said counting pulse so as to maintain an interference period information for a time period corresponding to the interference period in said electronic counter, in which interference period a correct digitally indicated measured value can not be obtained by said electronic counter due to the counting operation thereof, an OR circuit adapted to receive the output of said interference period information generating circuit so as to apply the output thereof to an inverter circuit, and a continuing signal-generating circuit adapted to receive said detecting pulse so as to generate a continuing signal which is maintained until the output of said interference period information generating circuit is extinguished, the inverted output of said continuing signal-generating circuit being applied to said OR circuit thereby permitting said instruction signal demanding the transfer of said digitally indicated measured value at said measuring point to said memory to be obtained by the output of said inverter circuit after said interference period elapses, the application of said instruction signal being delayed until after said interference period elapses when said detecting pulse is applied within said interference period, whereas said instruction signal is applied simultaneously with the application of said detecting pulse when said detecting pulse is applied after said interference period elapses.